March 23, 1971   N. J. BURNS, JR   3,572,395
PROTECTIVE ELBOW
Filed Dec. 23, 1968
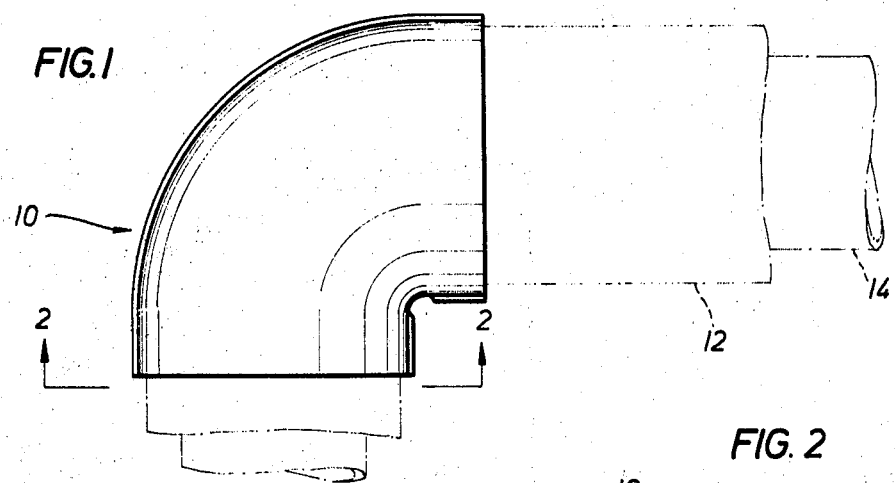
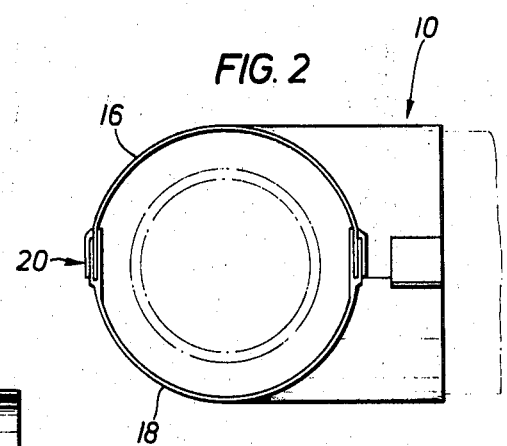
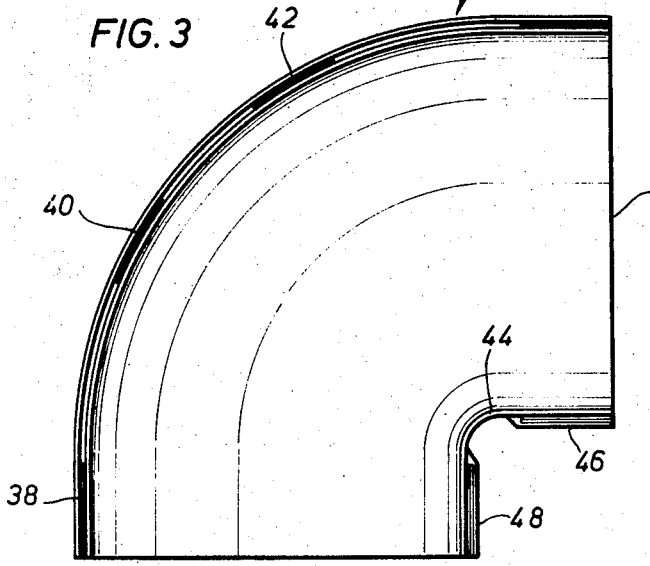
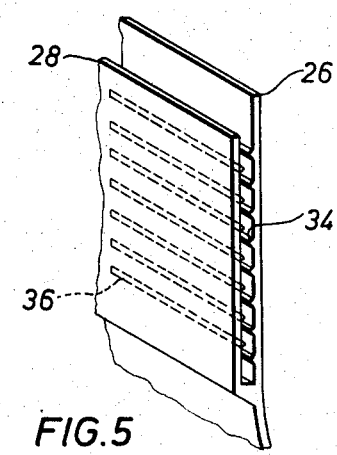
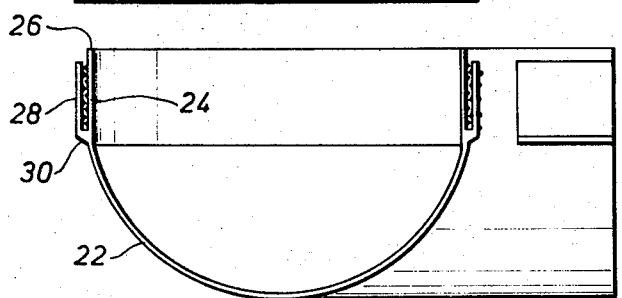
Noah J. Burns, Jr.
INVENTOR.
BY Donald Gunn
ATTORNEY

United States Patent Office 3,572,395
Patented Mar. 23, 1971

3,572,395
PROTECTIVE ELBOW
Noah J. Burns, Jr., Beaumont, Tex., assignor to
Trend Products, Inc.
Filed Dec. 23, 1968, Ser. No. 786,289
Int. Cl. F16l *11/00*
U.S. Cl. 138—162                               7 Claims

ABSTRACT OF THE DISCLOSURE

For use in protecting pipes which are covered with insulation and exposed to the outdoor climate, an elbow fitting which includes an upper portion and a lower portion which are joined together having an interlocking means along the respective edges of the two portions which interlock on being urged together, the interlocking means including a pair of spaced and parallel protruding lips providing a relatively deep slot therebetween, and a number of serrations formed at various areas in the slot to enable the lips to lock one with the other when the two portions of the elbow are brought together.

---

In petroleum refineries and chemical plants of many kinds, the piping system is normally exposed to atmospheric temperatures. In many cases, the fluid in the pipe is either quite warm or quite cool, with temperatures ranging as high as perhaps 250° F. and as low as perhaps −100° F. The piping of a liquid even a few feet exposed to atmospheric temperatures normally entails a substantial loss in radiation to or from the surrounding air. This problem has been corrected in times past by insulating the pipe, typically with a layer of perhaps two or three inches of asbestos insulation. Asbestos insulation is commonly used to prevent thermal losses in piping fluids about a chemical plant. However, the all weather exposure of the insulation is detrimental to its life. Thus, sweating, absorption of rain, wind and sun conditions materially shorten the life of the insulation. The insulation has been protected heretofore by thin aluminum covers, including elbows, which are typically bolted or riveted in place. The time of installation is lengthy, at best, and under the handicap of being at substantial heights above the ground, is likewise dangerous to personnel. It is with these problems in view that the present invention is summarized as a protective elbow for insulated piping exposed to the weather, which is impervious to water and fumes in the air, and which is placed on the insulated pipe by the mere expediency of pressing or urging the two sections together.

Many objects and advantages of the present invention will become more readily apparent from a consideration of the included specification and drawings, wherein:

FIG. 1 shows the elbow of the present invention installed on an insulated pipe represented in dotted line;

FIG. 2 is a sectional view taken along the line 2—2 of FIG. 1 showing the elbow of the present invention in its locked position;

FIG. 3 is a plan view of the lower half or portion of the elbow of the present invention;

FIG. 4 is an end view of the lower half shown in FIG. 3; and,

FIG. 5 is a portion of the connector means of the two portions comprising the elbow of the present invention.

Attention is first directed to FIG. 1 of the drawings which illustrates the elbow 10 installed on the insulation 12 of a pipe 14. The pipe 14 is of any nominal size. The pipe 14 has a 90° bend which is wrapped in insulation 12 which is of any composition and configuration. Typically the insulation 12 is one or two inches thick on the pipe and at the elbow. The bend in the pipe may be perpendicular or at some other angle although the 90° bend is most common. The elbow 10 is comprised of an upper portion 16 and a lower portion 18 as shown in FIG. 2, the upper and lower portions being similar in all regards, and their location, whether upper or lower, being a designation derived only from the drawings and not a limitation on the application of the elbow 10.

The elbow 10 as shown in FIG. 2 is preferably a polyethylene or similar plastic structure which is formed by injection molding. The exact formulation of the plastic is variable, but typically, a coloring agent, fire retardant agent, and ultra violet inhibitor are included in the material formed in the elbow 10. A joinder means comprised of engaging and locking lips 20 extends about the elbow 10 on the outer edge as shown in FIG. 1 and is likewise duplicated at the inner edge. The means 20 joins the two portions into one to provide a leak-proof protective housing for the elbow.

In FIGS. 3 and 4 considered together, the elbow of the present invention is shown to be formed somewhat in a semi-circular shape at a section line taken along the radius of curvature of the elbow. As shown in FIG. 4, the wall thickness at 22 is sufficient to provide a structure of suitable strength without becoming cumbersome or excessively large. The wall is of preferably uniform thickness throughout the elbow except that reinforcing beads or ribs can be added on the external surface as needed. Internally, the elbow is formed with a flat face at 24 to define one of the two protruding lips which forms a locking device 20. A lip 26 encircles the outer rim of the elbow and is preferably somewhat longer than an adjacent locking lip 28. The lip 28 protrudes from an enlarged shoulder 30 formed on the outer surface of the elbow 10. The shoulder 30 provides sufficient reinforcing to anchor the additional lip 28 firmly in position relative to the lip 26. The two lips encircle the outer edge of the elbow as shown in FIG. 3.

As shown in FIGS. 4 and 5, facing serrations 34 and 36 are placed on the lips 26 and 28 to provide suitable gripping means for locking the two halves of the present invention together. As shown in FIG. 3, the facing serrations are located at 38, 40, 42, and so on. It is not necessary that they extend along the full length of the locking means 20; as a matter of convenience, they may stretch perhaps an inch or two along the outer periphery. In between the gripping means 38, 40, and 42, the lips 26 and 28 have smooth facing surfaces.

Preferably, the lip 28 is not quite as long as the lip 26. When upper and lower shell potrions are engaged to form the elbow in the completed state, the lip 26 on the lower half or portion is positioned either inside or outside of the lip 26 on the upper portion. The relative positioning is inconsequential. As will be understood, joinder of the two halves forces either the lip 26 or 28 of one half into the slot between the two lips of the other half. The gripping means described herein are more than adequate to lock the two portions together.

Attention is next directed to the inner curvature at 44 shown in FIG. 3. The joinder means comprises a pair of spaced lips at 46 and similar spaced lips at 48. The joinder means on the inner radius at 44 are preferably straight whereas the lips 26 and 28 on the otuer edge of the assembled elbow curve gently at all points around the periphery of the elbow. Because of the tighter radius, the joiner means 20 is somewhat shorter at the inner radius 44. This is of no particular consequence, and still provides adequate strength for holding the two portions together.

Thus, the full length of the joinder means at 46 and 48 are serrated on the facing inner surfaces to provide increased frictional engagement of the two portions of the elbow 10. Since the radius of curvature at 44 is rather tight, economies of manufacturing are achieved by omitting the spaced lips comprising the joinder means of the present invention at the curvature itself.

Again, on mating of the upper and lower portions, the means 46 and 48 present the pair of spaced protruding lips which engage the lips of the similar opposite portion and which grips one another when they are forced together. Either the upper or lower portion may be positioned inside of the other.

The foregoing has described the preferred embodiment of the present invention. In operation, it is preferably installed at an insulated pipe elbow by placing one of the two portions on the elbow. The other portion is lightly placed on the opposite side of the elbow and the protruding lips are engaged. For instance, the downwardly projecting lip 26 of the upper member may be forced between the lips 26 and 28 of the lower member. The alignment is made relatively easy since the present invention is preferably formed of a slightly yieldable plastic material. Once the alignment is achieved on the outer edge or perimeter, the inner perimeter is easily aligned to pair the locking means 20 at all points for final joinder. A squeezing force is applied by hand, beginning perhaps at one end of the elbow and working to the other end. This forces the parted lips into locking engagement at which time the serrations on the lips lock one with the other. When the parts are forced sufficiently together to provide full engagement of the upper and lower locking means, then the device has been installed and no further effort is required for installation. The elbow is then complete and may be left untended for an indefinite period of time.

By comparison or contrast, elbows of the present art are typically aluminum shells which are first placed in position, drilled at overlapping flanges, blind rivets are then set in the drilled holes and expanded, and the elbow is then completed. Ignoring problems of fatigue in which metal elbows have been found generally inadequate, the installation requires perhaps thirty minutes on the average. The present invention is easily installed in two or three minutes to provide measurable savings in installation effort. This, coupled with the fact that the installation might be sixty feet above the ground in difficult environments, indicates that the present invention provides a noteworthy saving in time, effort and safety.

The foregoing has described the preferred embodiment of the present invention. Many variations and alterations therein may be adapted within the scope of the present disclosure. However, the present invention is defined by the claims appended hereto. The word "shell" as used in the claims hereof is defined as an enclosing member fitting around or about an insulated elbow. The shell members may be identical or one may enclose greater or lesser areas, as the case may be.

What is claimed is:

1. A protective elbow for insulating a bend portion of an elongate generally tubular member, comprising:
   (a) a pair of similar upper and lower shell members having facing inner and outer edges and which are adapted to be joined to one another;
   (b) joinder means found at least partially along both the inner and outer edges of said shell members, said joinder means comprising a first lip spaced from a second lip, each of said lips having opposing facing surfaces at least partially along the length thereof, said lips defining a space therebetween; and,
   (c) serration means on facing surfaces of said lips protruding into the space such that said serration means on said upper and lower shell members lock together when said shell members are engaged.

2. The invention of claim 1, in which said upper and lower shell members are identical and interchangeable.

3. The invention of claim 1 wherein the inner edge includes a pair of parallel straight lips spaced from one another.

4. The invention of claim 1 wherein the outer edge inscribes an arc of curvature related to the angle of the elbow to be insulated and said elbow is located along said arc of curvature.

5. The invention of claim 1, including a flat surface on an opposing face of said first and second lips, said flat surface adapted to be pressed against either of said two lips of the opposite shell member when said shell members are joined.

6. A protective elbow for insulating a bend portion of an elongate generally tubular member, comprising:
   (a) a pair of similar upper and lower shell members having facing inner and outer edges and which are adapted to be joined to one another;
   (b) joinder means found at least partially along both the inner and outer edges of said shell members; and,
   (c) said joinder means including a first group of serrations frictionally engaging a second group of serrations, said groups of serrations being respectively on said upper and lower shell members.

7. The invention of claim 6, in which said upper and lower shell members are identical and interchangeable.

References Cited

UNITED STATES PATENTS

| | | | |
|---|---|---|---|
| 3,295,560 | 1/1967 | Demmler | 138—166 |
| 3,369,564 | 2/1968 | Davis et al. | 138—168 |
| 3,425,456 | 2/1969 | Schibig | 138—162 |

FOREIGN PATENTS

| | | | |
|---|---|---|---|
| 989,870 | 4/1965 | Great Britain | 138—128 |

HENRY S. JAUDON, Primary Examiner

U.S. Cl. X.R.

138—166